(12) United States Patent
Kim et al.

(10) Patent No.: US 9,880,698 B2
(45) Date of Patent: *Jan. 30, 2018

(54) THREE-DIMENSIONAL SPACE INTERFACE APPARATUS AND METHOD

(71) Applicant: SAMSUNG ELECTRONICS CO., LTD., Suwon-si (KR)

(72) Inventors: Jung Bae Kim, Hwaseong-si (KR); Chang Yeong Kim, Seoul (KR); Won-Chul Bang, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/188,314

(22) Filed: Jun. 21, 2016

(65) Prior Publication Data

US 2016/0299663 A1 Oct. 13, 2016

Related U.S. Application Data

(63) Continuation of application No. 12/923,932, filed on Oct. 14, 2010, now Pat. No. 9,377,858.

(30) Foreign Application Priority Data

Oct. 27, 2009 (KR) .......................... 10-2009-0102228

(51) Int. Cl.
*G06F 3/01* (2006.01)
*G06F 3/0481* (2013.01)
(Continued)

(52) U.S. Cl.
CPC .......... *G06F 3/04815* (2013.01); *G06F 3/012* (2013.01); *G06F 3/016* (2013.01);
(Continued)

(58) Field of Classification Search
CPC ...... G06F 3/048; G06F 3/0425; G06F 3/0426; G06F 3/016; G06F 3/017
See application file for complete search history.

(56) References Cited

U.S. PATENT DOCUMENTS 6,031,519 A 2/2000 O'brien
6,084,587 A * 7/2000 Tarr ..................... G06T 15/00
345/419

(Continued)

FOREIGN PATENT DOCUMENTS

JP 6-102980 A 4/1994
JP 10-11249 A 1/1998
(Continued)

OTHER PUBLICATIONS

Extended European Search Report dated Jun. 8, 2011 in counterpart European Application No. 10187285.1. (6 pages in English).

*Primary Examiner* — Barry Drennan
*Assistant Examiner* — Phong Nguyen
(74) *Attorney, Agent, or Firm* — NSIP Law

(57) ABSTRACT

A three-dimensional (3D) space interface apparatus and method are provided. The 3D space interface apparatus provides an interface in which a user may directly touch and transform a 3D virtual object of a 3D space, which is shown in various ways depending on a position of the user. The 3D space interface apparatus may provide for manipulation of the 3D virtual object by the user using a sensing signal that senses the position and movement of a manipulation object the user. Specifically, an interface unit of the apparatus verifies, using the sensing signal, whether a predetermined movement of the manipulation object has occurred or whether a contact between the 3D virtual object and the manipulation object has been made, and generates a predetermined reaction corresponding to the predetermined movement or the contact.

21 Claims, 5 Drawing Sheets

(51) Int. Cl.
  *G06F 3/03*    (2006.01)
  *G06F 3/0484*  (2013.01)
  *G06T 15/20*   (2011.01)
  *G06T 19/20*   (2011.01)

(52) U.S. Cl.
  CPC ............ *G06F 3/017* (2013.01); *G06F 3/0304* (2013.01); *G06F 3/04845* (2013.01); *G06T 15/20* (2013.01); *G06T 19/20* (2013.01)

(56) References Cited

U.S. PATENT DOCUMENTS

| | | | |
|---|---|---|---|
| 6,111,577 A * | 8/2000 | Zilles | G06F 3/011 |
| | | | 345/156 |
| 6,222,465 B1 | 4/2001 | Kumar et al. | |
| 6,388,639 B1 | 5/2002 | Hoshino et al. | |
| 6,950,116 B2 | 9/2005 | Ternullo | |
| 7,225,404 B1 * | 5/2007 | Zilles | G06F 3/011 |
| | | | 715/701 |
| 7,379,048 B2 | 5/2008 | Anderson | |
| 2002/0140633 A1 | 10/2002 | Rafii et al. | |
| 2003/0179198 A1 | 9/2003 | Uchiyama | |
| 2004/0036717 A1 | 2/2004 | Kjeldsen et al. | |
| 2004/0095311 A1 | 5/2004 | Tarlton et al. | |
| 2004/0183775 A1 | 9/2004 | Bell | |
| 2004/0240709 A1 | 12/2004 | Shoemaker | |
| 2005/0059488 A1 | 3/2005 | Larsen et al. | |
| 2005/0166163 A1* | 7/2005 | Chang | G06F 3/017 |
| | | | 715/863 |
| 2006/0077212 A1 | 4/2006 | Fitzmaurice et al. | |
| 2006/0238502 A1 | 10/2006 | Kanamori et al. | |
| 2006/0267997 A1 | 11/2006 | Walls et al. | |
| 2007/0188492 A1 | 8/2007 | Venkataraman | |
| 2008/0100572 A1* | 5/2008 | Boillot | G06F 1/1632 |
| | | | 345/158 |
| 2009/0066725 A1* | 3/2009 | Nogami | A63F 13/10 |
| | | | 345/632 |
| 2009/0077504 A1* | 3/2009 | Bell | G06F 3/011 |
| | | | 715/863 |
| 2009/0300551 A1* | 12/2009 | French | G09B 19/003 |
| | | | 715/848 |
| 2010/0039377 A1 | 2/2010 | Lewis et al. | |
| 2010/0091012 A1 | 4/2010 | Newton et al. | |
| 2010/0208035 A1 | 8/2010 | Pinault et al. | |
| 2010/0234094 A1* | 9/2010 | Gagner | G07F 17/32 |
| | | | 463/20 |
| 2010/0302015 A1 | 12/2010 | Kipman et al. | |
| 2011/0012830 A1* | 1/2011 | Yeh | G06F 3/011 |
| | | | 345/158 |

FOREIGN PATENT DOCUMENTS

| | | |
|---|---|---|
| JP | 2002-58045 A | 2/2002 |
| JP | 2003-330582 A | 11/2003 |
| JP | 2004-334590 A | 11/2004 |
| JP | 2005-115467 A | 4/2005 |
| JP | 2008-40832 A | 2/2008 |
| KR | 1999-008158 A | 1/1999 |
| KR | 2002-0073890 A | 9/2002 |
| KR | 10-2005-0083908 A | 8/2005 |
| KR | 10-2007-0090730 A | 9/2007 |
| WO | WO 2007/100204 A1 | 9/2007 |

* cited by examiner

THREE-DIMENSIONAL SPACE INTERFACE APPARATUS AND METHOD

CROSS-REFERENCE TO RELATED APPLICATIONS

This application is a continuation of U.S. application Ser. No. 12/923,932 filed on Oct. 14, 2010, and claims the benefit under 35 U.S.C § 119(a) of Korean Patent Application No. 10-2009-0102228, filed on Oct. 27, 2009, in the Korean Intellectual Property Office, the disclosure of which is incorporated herein by reference.

BACKGROUND

1. Field

Exemplary embodiments of the present disclosure relate to an interface, and more particularly, to a three-dimensional (3D) space interface apparatus and method that may manipulate a 3D virtual object displayed through a 3D display using motions of a user in a 3D space and direct contact between the user and the 3D virtual object.

2. Description of the Related Art

In an information processing system or an information control system such as a computer and the like, user input and output apparatuses may be used for a user interface. As a user input apparatus, a keyboard, a mouse, a touch screen, and the like may be widely used, and as a user output apparatus, a monitor screen, a printer, and the like may be widely used.

The input apparatus, such as a conventional mouse and the like, may support only two-dimensional (2D) user input. Specifically, the user input performed by the user input apparatus may be sensed or detected by dividing the user input into an input of an X-axis direction, that is, a reference axis on a plane and an input of a Y-axis direction perpendicular to the X-axis. Also, a conventional graphic screen excluding a specific application field may be configured focusing on the 2D user output.

However, along with developments in techniques, a three-dimensional (3D) display apparatus and various input apparatuses have been developed and provided. Currently, various interface methods that may manipulate a virtual object displayed through a 2D display using the hands of a user have been suggested.

Particularly, a screen touch technique is gaining much attention. In the screen touch technique, a user's request such as a request to directly manipulate a 3D object using the user's own hands may be reflected. However, an interface using the screen touch technique may not provide a sensation of directly manipulating the 3D object to the user, but may instead merely provide a sensation of touching and manipulating a 2D object within a screen.

SUMMARY

According to an aspect of exemplary embodiments of the present disclosure, there is provided a three-dimensional (3D) space interface apparatus, including: a 3D display unit to output a 3D virtual object; a sensing unit to generate a sensing signal for sensing a position and a movement of a user and for sensing a position and a movement of a manipulation object manipulating the 3D virtual object; and an interface unit to verify, using the sensing signal, whether a predetermined movement of the manipulation object is created or whether a contact between the 3D virtual object and the manipulation object is created, and to generate a predetermined reaction corresponding to the predetermined movement or the contact.

In this instance, the sensing unit may be at least one of a color camera, a depth camera, and a motion sensor.

Also, the interface unit may include: a space determination unit to determine a rendering space where the 3D virtual object is output and a sensing space where a manipulation of the 3D virtual object is sensed, using the sensing signal; a 3D rending unit to 3D-render the 3D virtual object in accordance with the position of the user to output the rendered 3D virtual object in the rendering space; a manipulation object-detection unit to detect the manipulation object positioned in the sensing space using the sensing signal and to trace a movement of the manipulation object; a contact sensing unit to sense where a contact between the manipulation object and the 3D virtual object is created; a motion recognition unit to trace the movement of the manipulation object to verify whether the predetermined movement is generated; and a reaction generation unit to generate the predetermined reaction corresponding to the predetermined movement or the contact.

Also, the space determination unit may trace the position of the user and a face of the user using the sensing signal, determine, as the rendering space, an entire space between a 3D display unit and a user face, and determine, as the sensing space, a predetermined sized space between the 3D display unit and the user face.

Also, the manipulation object-detection unit may detect, as the manipulation object, hands of the user within the sensing space, a body of the user within the sensing space, and an object within the sensing space.

Also, the contact sensing unit may correct a distortion of the rendering and sensing spaces, each space varying depending on the position of the user, aggregate the corrected rendering and sensing spaces, and verify whether a contact between the 3D virtual object output in the corrected rendering space and the manipulation object detected in the corrected sensing space is created.

Also, the predetermined reaction corresponding to the predetermined movement and the contact may be at least one of a transformation expanding or compressing the 3D virtual object, a rotation of the 3D virtual object, a movement of the 3D virtual object, a selection of a portion of the 3D virtual object where the contact is created, a performance of a predetermined command corresponding to the predetermined movement or the contact, a creation of a new 3D virtual object, and a removal of the 3D virtual object.

Also, the reaction generation unit may further include an ultrasonic wave- generation unit to generate a contact signal enabling a contact sensation by sending ultrasonic waves to the contacted manipulation object when the contact is created.

According to another aspect of exemplary embodiments, there is provided a 3D space interface method, including: generating a sensing signal for sensing a position and a movement of a user and for sensing a position and a movement of a manipulation object manipulating the 3D virtual object; interfacing including outputting the 3D virtual object, verifying, using the sensing signal, whether a predetermined movement of the manipulation object is created or whether a contact between the 3D virtual object and the manipulation object is created, and generating a predetermined reaction corresponding to the predetermined movement and the contact; and outputting the 3D virtual object where the generated reaction is applied.

In this instance, the sensing signal may be generated by at least one of a color camera, a depth camera, and a motion sensor.

Also, the interfacing may include: determining a rendering space where the 3D virtual object is output and a sensing space where a manipulation of the 3D virtual object is sensed, using the sensing signal; 3D-rendering the 3D virtual object in accordance with the position of the user to output the rendered 3D virtual object in the rendering space; detecting the manipulation object positioned in the sensing space using the sensing signal and tracing a movement of the manipulation object; sensing whether the contact between the manipulation object and the 3D virtual object is created; verifying whether the predetermined movement of the manipulation object is created by tracing the movement of the manipulation object; and generating the predetermined reaction corresponding to the predetermined movement and the contact.

Also, the determining of the rendering space and the sensing space may include: tracing the position of the user and a face of the user using the sensing signal; determining, as the rendering space, an entire space between a 3D display unit and a user face; and determining, as the sensing space, a predetermined sized space between the 3D display unit and the user face.

Also, the object of the manipulation object may be detected, as the manipulation object, hands of the user within the sensing space, a body of the user within the sensing space, and an object within the sensing space.

Also, the sensing of whether the contact is created may include: correcting a distortion of the rendering and sensing spaces varying depending on the position of the user; and aggregating the corrected rendering and sensing spaces to verify whether a contact between the 3D virtual object output in the corrected rendering space and the manipulation object detected in the corrected sensing space is created.

Also, the predetermined reaction corresponding to the predetermined movement and the contact may be at least one of a transformation of expanding or compressing the 3D virtual object, a rotation of the 3D virtual object, a movement of the 3D virtual object, a selection of a portion of the 3D virtual object where the contact is created, a performance of a predetermined command corresponding to the predetermined movement or the contact, a creation of a new 3D virtual object, and a removal of the 3D virtual object.

Also, the 3D space interface method may further include sending ultrasonic waves to the contacted manipulation object when the contact is created to generate a contact signal enabling a contact sensation.

According to another aspect of exemplary embodiments, an apparatus for interfacing with a rendered three-dimensional (3D) virtual object in a 3D space is provided. The apparatus includes a sensing unit to generate a sensing signal for tracking a position and a movement of a manipulation object of a user in a sensing space of the 3D virtual object, an interface unit to verify, using the sensing signal, whether a predetermined movement of the manipulation object with respect to the 3D object has occurred in the sensing space, and a reaction generation unit to generate a predetermined reaction corresponding to the predetermined movement and to output the predetermined reaction such that it may be perceived by the user.

According to another aspect of exemplary embodiments, a method for interfacing with a rendered three-dimensional (3D) virtual object in a 3D space is provided. The method includes generating a sensing signal to track a position and a movement of a manipulation object of a user in a sensing space of the 3D virtual object, verifying, using the sensing signal, whether a predetermined movement of the manipulation object with respect to the 3D object has occurred in the sensing space, and generating a predetermined reaction corresponding to the predetermined movement and outputting the predetermined reaction such that it may be perceived by the user.

Additional aspects, features, and/or advantages of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of exemplary embodiments, taken in conjunction with the accompanying drawings of which.

DETAILED DESCRIPTION

Figure 1:
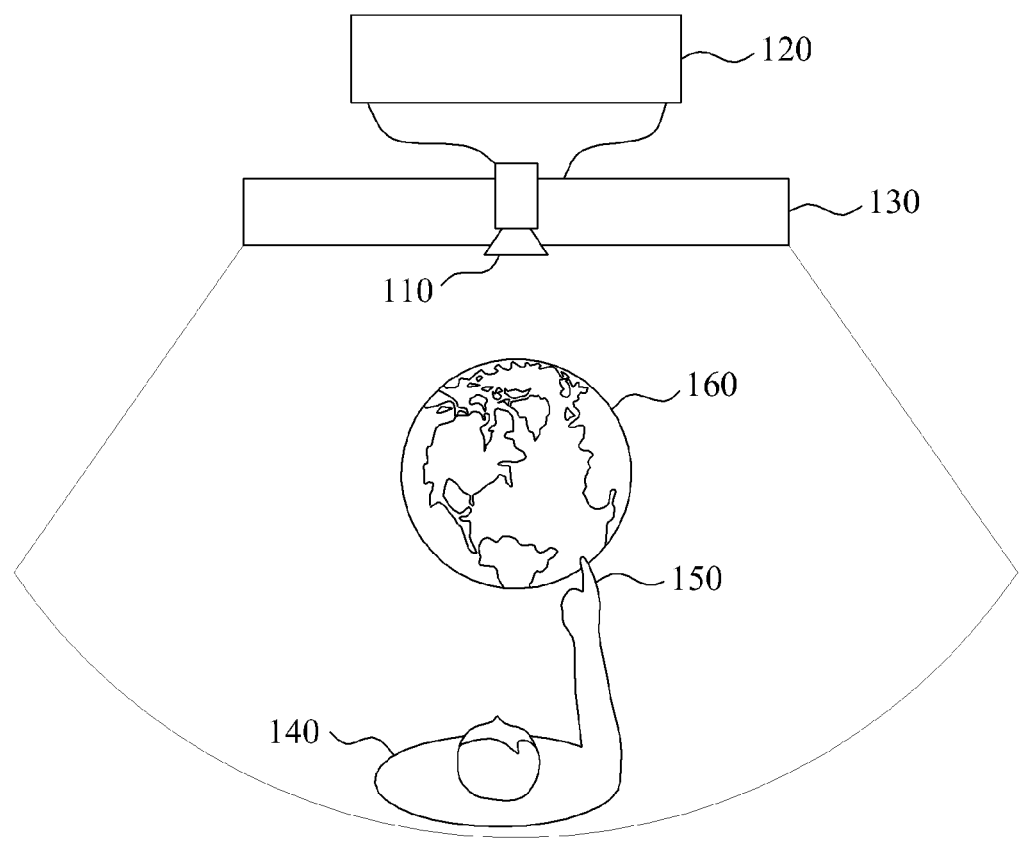
FIG. 1 illustrates an example of an operation of a three-dimensional (3D) space interface apparatus according to exemplary embodiments.

Reference will now be made in detail to exemplary embodiments, examples of which are illustrated in the accompanying drawings, wherein like reference numerals refer to the like elements throughout. Exemplary embodiments are described below to explain the present disclosure by referring to the figures.

Exemplary embodiments relate to a three-dimensional (3D) space interface apparatus and method that may directly touch and transform a virtual object in a 3D space by sensing motions of a user. In this instance, the virtual object may be differently shown depending on a position of the user.

The 3D space interface apparatus may provide a manipulation of a 3D virtual object using a user's body or using one or more individual body parts of the user. In particular, the 3D space interface apparatus may trace a position of the user to reduce an error that may occur due to contact between the 3D virtual object and the user.

FIG. 1 illustrates an example of an operation of a three-dimensional (3D) space interface apparatus according to exemplary embodiments. Referring to FIG. 1, the 3D space interface apparatus includes a sensing unit 110, an interface unit 120, and a 3D display unit 130.

The sensing unit 110 may generate a sensing signal for sensing a position and a movement of a user 140 and for sensing a position and a movement of a manipulation object 150, e.g., a user's hand or finger, manipulating a 3D virtual object 160. The sensing unit 110 may include, for example, a color camera, a depth camera, and a motion sensor. Accordingly, the sensing signal may be one of a color image, a depth image measuring a distance from an object, a motion of the user, and the like.

The 3D display unit 130 may output the 3D virtual object 160 as a 3D image in a direction of the user 140 in accordance with a control of the interface unit 120.

The interface unit 120 may verify, using the sensing signal, whether a predetermined movement of the manipulation object has occurred or whether contact has occurred between the 3D virtual object and the manipulation object, and generate a predetermined reaction corresponding to the predetermined movement or the contact to thereby apply the generated reaction to the 3D virtual object 160.

Figure 2:
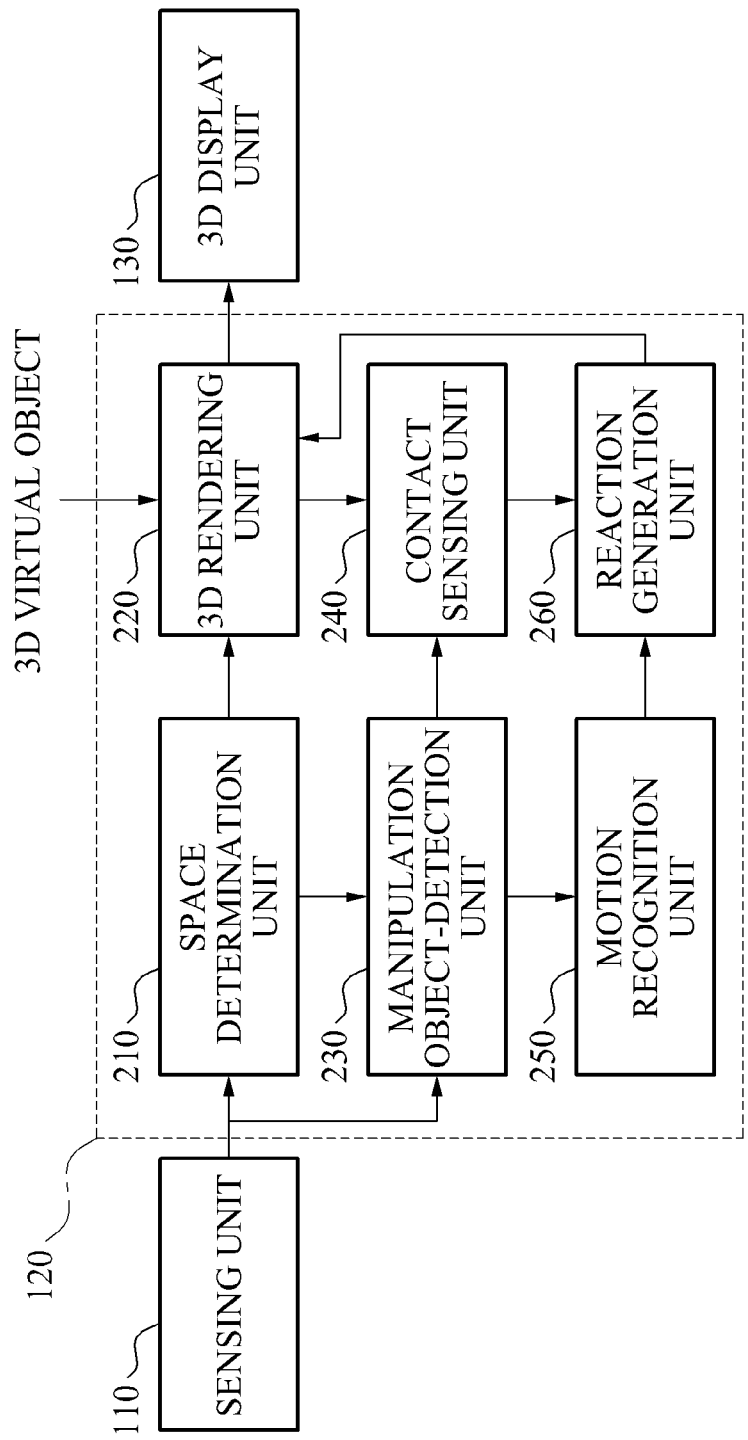
FIG. 2 illustrates a configuration of a 3D space interface apparatus according to exemplary embodiments.

FIG. 2 illustrates a configuration of a 3D space interface apparatus according to exemplary embodiments. Referring to FIG. 2, the interface unit 120 of the 3D space interface apparatus may include a space determination unit 210, a 3D rendering unit 220, a manipulation object-detection unit 230, a contact sensing unit 240, a motion recognition unit 250, and a reaction generation unit 260.

The space determination unit 210 may determine, using the sensing signal, a rendering space where the 3D virtual object is output and a sensing space where a manipulation of the 3D virtual object is sensed.

The space determination unit 210 may trace a position and a face of the user using the sensing signal. The space determination unit 210 may determine, as the rendering space, an entire space between a 3D display plane and a user face, and determine, as the sensing space, a predetermined sized space between the 3D display plane and the user face. For example, in an embodiment the sensing space occupies a predetermined portion of the rendering space. The space determination unit 210 may determine a sensing resolution signifying a number of times the manipulation object is sensed per hour in the sensing space. The sensing resolution may be determined based on accuracy of the sensing signal of the sensing unit 110, or may be predetermined.

The 3D rendering unit 220 may receive the 3D virtual object, 3D-render the received 3D virtual object depending on a position of the user, and output the 3D-rendered 3D virtual object in the rendering space determined by the space determination unit 210. The 3D rendering unit 220 may 3D-render the 3D virtual object at a location where the reaction generated in the reaction generation unit 260 has been applied, and output the 3D-rendered 3D virtual object in the rendering space.

The manipulation object-detection unit 230 may detect, using the sensing signal, the manipulation object, that is, an object manipulating the 3D virtual object in the sensing space, and may trace the manipulation object. The manipulation object may be a part of the body of the user, such as a hand or finger, or an object that is positioned in the sensing space, such as a pointing device. Specifically, the manipulation object-detection unit 230 may detect, as the manipulation object, hands of the user within the sensing space, a body of the user within the sensing space, and an object within the sensing space, and trace a movement of the manipulation object.

The contact sensing unit 240 may sense whether contact has occurred between the manipulation object and the 3D virtual object. The contact sensing unit 240 may correct a distortion of the rendering space and the sensing space, which may each vary depending on the position of the user, and may aggregate the corrected rendering space and the corrected sensing space. The contact sensing unit 240 may further verify whether contact between the 3D virtual object output in the corrected rendering space and the manipulation object detected in the corrected sensing space has occurred.

The motion recognition unit 250 may trace the movement of the manipulation object to verify whether the predetermined movement of the manipulation object has occurred. The motion recognition unit 250 may divide, in real time, a movement of the manipulation object including a speed, a direction, a shape, a size, a position, and the like, and compare the divided movement and the stored predetermined movement of the manipulation object to thereby recognize whether the predetermined movement of the manipulation object has occurred.

The reaction generation unit 260 may generate a predetermined reaction corresponding to the predetermined movement or to the contact between the 3D virtual object and the manipulation object. The predetermined reaction corresponding to the contact may be a transformation expanding or compressing the 3D virtual object, changing a color, texture, or opacity of the 3D virtual object, or a rotation or a movement of the 3D virtual object. Also, the predetermined reaction corresponding to the predetermined movement may include generation of a new 3D virtual object or removal of the output 3D virtual object. Still further, the predetermined reaction may include a selection of a portion of the 3D virtual object where the contact has occurred, or a performance of a predetermined command corresponding to the predetermined movement or the contact.

Also, to provide a sensation of contact to the user or to the manipulation object in the area where contact between the manipulation object and the 3D virtual object has occurred, the reaction generation unit 260 may generate a contact signal enabling a contact sensation, for example, by sending ultrasonic waves to the manipulation object through an ultrasonic wave-generation unit (not illustrated).

Hereinafter, a 3D space interface method of the 3D space interface apparatus having the above described configuration will be described in detail with reference to FIG. 3.

Figure 3:
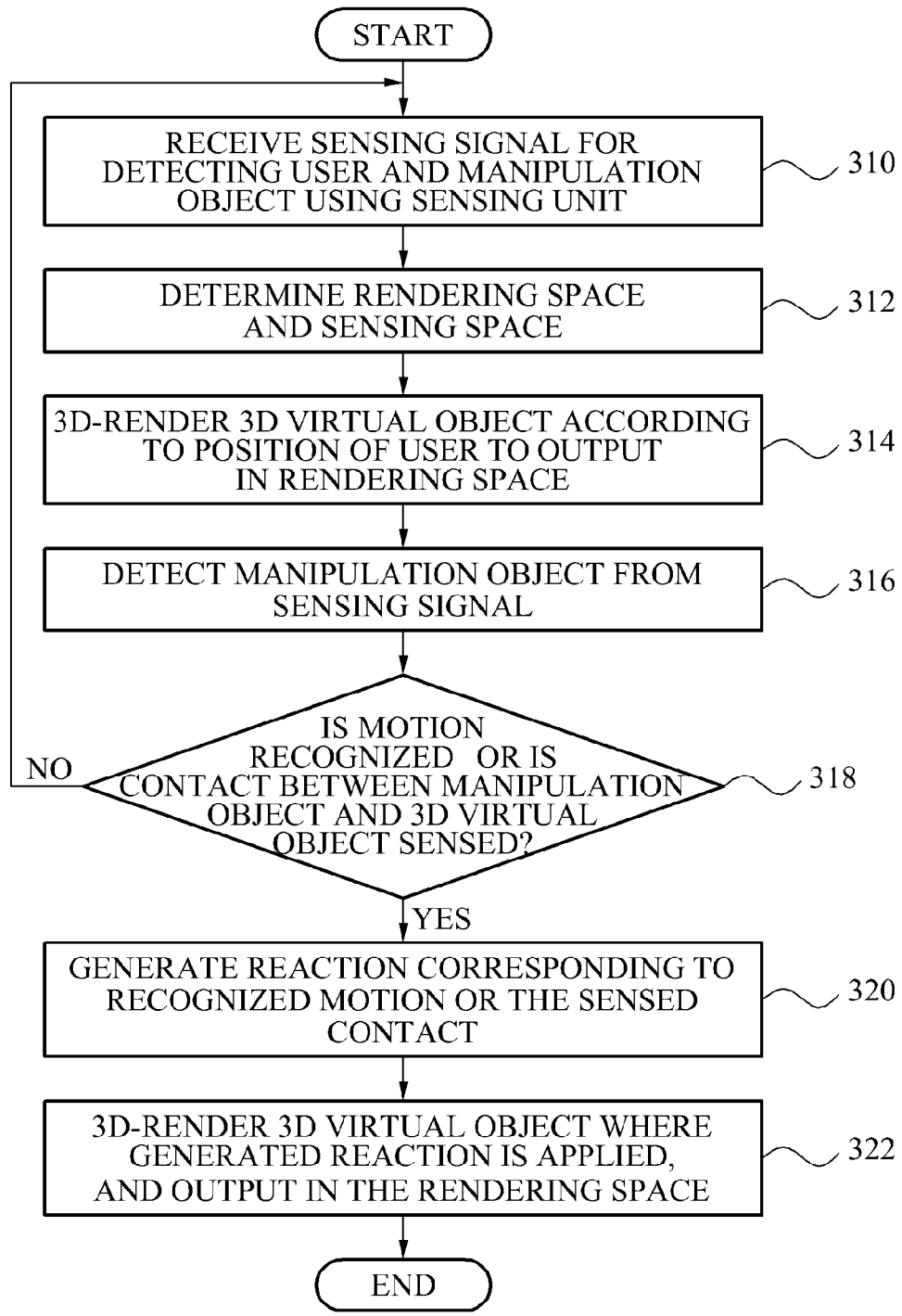
FIG. 3 is a flowchart illustrating a 3D space interface process according to exemplary embodiments.

FIG. 3 is a flowchart illustrating a 3D space interface process according to exemplary embodiments. Referring to FIG. 3, in operation 310, the interface unit 120 of the 3D space interface apparatus may receive a sensing signal for detecting a user and the manipulation object using the sensing unit.

In operation 312, the interface unit 120 may determine, using the sensing signal, a rendering space where the 3D virtual object is o and a sensing space where a manipulation of the 3D virtual object is sensed. The determining of the rendering space and the sensing space will be further described with reference to FIG. 4.

In operation 314, the interface unit 120 may receive the 3D virtual object, 3D-render the received 3D virtual object depending on a position of the user, and output the 3D-rendered 3D virtual object in the rendering space.

In operation 316, the interface unit 120 may detect, using the sensing signal, the manipulation object, that is, an object manipulating the 3D virtual object in the sensing space, and trace the manipulation object. In this instance, the manipulation object may be a part of a body of the user or an object, which is located in the sensing space.

In operation 318, the interface unit 120 may verify whether a predetermined movement of the manipulation object has occurred or whether contact has been made between the manipulation object and the 3D virtual object. Whether contact between the manipulation object and the 3D virtual object has been made will be further described in detail with reference to FIG. 5.

When the predetermined movement has not occurred or when the contact has not been made, based on a verified result of operation 318, the interface unit 120 may return to operation 310 and repeatedly perform operations 310 to 318.

When the predetermined movement is created or when the contact is created based on the verified result of operation 318, the interface unit 120 may advance to operation 320, and generate a predetermined reaction corresponding to the predetermined movement or the contact.

The predetermined reaction corresponding to the contact may be a transformation expanding or compressing the 3D virtual object, or a rotation or a movement of the 3D virtual object. Also, the predetermined reaction corresponding to the predetermined movement may be a generation of a new 3D virtual object or a removal of the output 3D virtual object. Various reactions other than the above described reactions may be generated.

In operation 322, the interface unit 120 may 3D-render the 3D virtual object where the reaction generated in operation 322 is applied, and output the 3D-rendered 3D virtual object in the rendering space.

Figure 4:
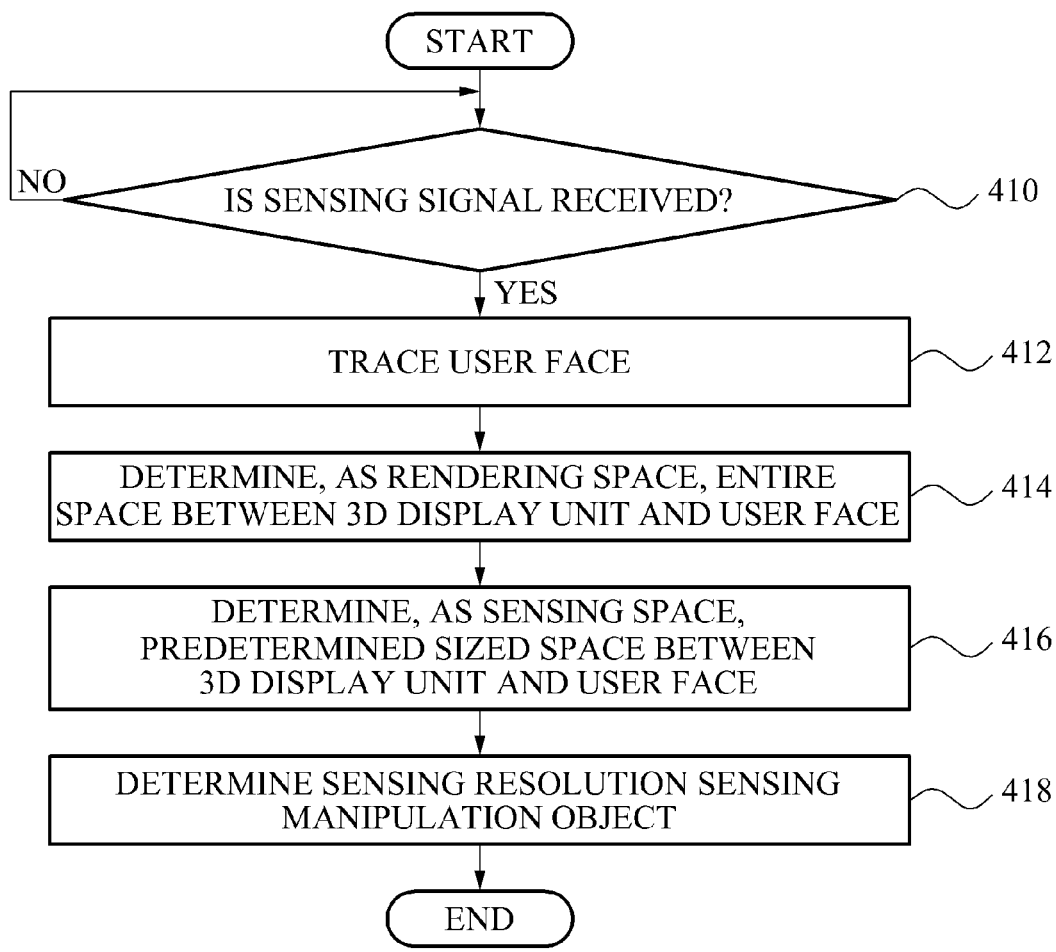
FIG. 4 is a flowchart illustrating a process of determining a space for a 3D space interface according to exemplary embodiments.

FIG. 4 is a flowchart illustrating a process of determining a space for a 3D space interface according to exemplary embodiments. Referring to FIG. 4, when receiving the sensing signal from the sensing unit in operation 410, the space determination unit 210 of the 3D space interface apparatus may trace a position and a face of the user using the sensing signal in operation 412.

In operation 414, the space determination unit 210 may determine, as the rendering space, an entire space between the 3D display plane and the user face.

In operation 416, the space determination unit 210 may determine, as the sensing space, a predetermined sized space between the 3D display plane and the user face.

In operation 418, the space determination unit 210 may determine a sensing resolution signifying a number of times the manipulation object is sensed per hour in the sensing space. In this instance, the sensing resolution may be determined based on accuracy of the sensing signal of the sensing unit 110, or may be predetermined.

Figure 5:
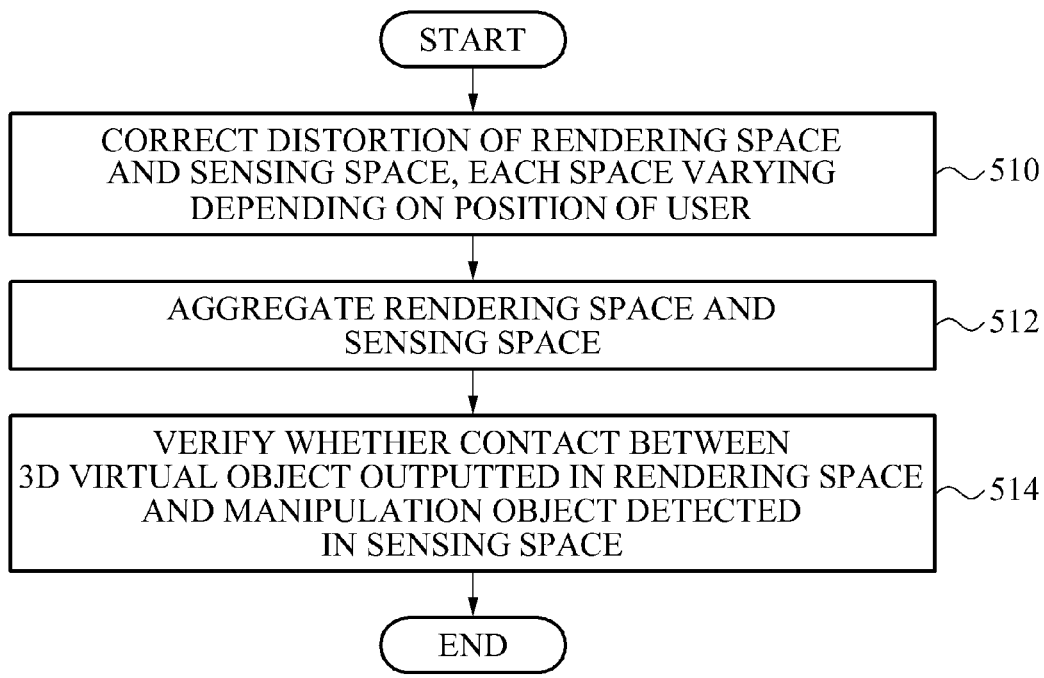
FIG. 5 is a flowchart illustrating a process of verifying a contact with a 3D virtual object for a 3D space interface according to exemplary embodiment.

FIG. 5 is a flowchart illustrating a process of verifying a contact with a 3D virtual object for a 3D space interface according to exemplary embodiments. Referring to FIG. 5, in operation 510, the contact sensing unit 240 of the 3D space interface apparatus may correct a distortion of the rendering space and the sensing space, which may each vary depending on a position of the user, in order to sense contact between the manipulation object and the 3D virtual object. In operation 512, the contact sensing unit 240 may aggregate the corrected rendering space and the corrected sensing space. In operation 514, the contact sensing unit 240 may verify whether contact has been made between the 3D virtual object output in the rendering space and the manipulation object detected in the sensing space.

As described above, according to exemplary embodiments, the 3D space interface apparatus and method may provide an interface through a movement of the user or through a direct contact between a body of the user and the 3D virtual object by matching the rendering space where the 3D virtual object is output with the sensing space where a movement of the user is sensed. Also, according to exemplary embodiments, the 3D space interface apparatus and method may reduce an error occurring by a position movement of the user by tracing the user or changing the sensing space and the rendering space depending on the position of the user.

The above described methods may be recorded, stored, or fixed in one or more computer-readable storage media that include program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter.

The described hardware devices may be configured to act as one or more software modules in order to perform the operations and methods described above, or vice versa. The instructions may be executed on any processor, general purpose computer, or special purpose computer such as a 3D space interface apparatus. Further, the software modules may be controlled by any processor. In addition, in some embodiments a computer-readable storage medium may be distributed among computer systems connected through a network and computer-readable codes or program instructions may be stored and executed in a decentralized manner.

Although a few exemplary embodiments have been shown and described, it would be appreciated by those skilled in the art that changes may be made in these exemplary embodiments without departing from the principles and spirit of the disclosure, the scope of which is defined in the claims and their equivalents.

What is claimed is:

1. A three-dimensional (3D) space interface apparatus comprising:
a processor configured to control one or more processor-executable units;
a 3D display unit configured to output a 3D virtual object;
a sensing generator, including at least one processor, configured to generate a sensing signal for sensing a position and a movement of a manipulation object;
a space determiner, including the at least one processor, configured to determine:
a rendering space located between the 3D display unit and a user, in which the 3D virtual object will be outputted, and
a sensing space occupying a predetermined portion of the rendering space, in which the manipulation object will be sensed; and
an interface, including the at least one processor, configured to verify, using the sensing signal, whether a contact between the 3D virtual object and the manipulation object has been made, and to generate a predetermined reaction corresponding to the contact when the contact has been verified as being made,
wherein the interface corrects a distortion of the rendering space and the sensing space, each space varying depending on a position of the user, aggregates the corrected rendering space and the corrected sensing space, and verifies whether the contact has been made between the 3D virtual object output in the corrected rendering space and the manipulation object in the corrected sensing space.

2. The 3D space interface apparatus of claim 1, wherein the sensing generator comprises at least one of a color camera, a depth camera, and a motion sensor.

3. The 3D space interface apparatus of claim 1, wherein the interface comprises:
   a 3D renderer, including the at least one processor, configured to 3D-render the 3D virtual object in accordance with the position of the user to output the rendered 3D virtual object in the rendering space;
   a manipulation object detector configured to detect the manipulation object positioned in the sensing space using the sensing signal and to trace a movement of the manipulation object;
   a contact sensor configured to sense whether contact between the manipulation object and the 3D virtual object has been made;
   a motion recognizer, including the at least one processor, configured to trace movement of the manipulation object to verify whether a predetermined movement of the manipulation object has occurred; and
   a reaction generator, including the at least one processor, configured to generate the predetermined reaction corresponding to one or more of the predetermined movement and the contact.

4. The 3D space interface apparatus of claim 3, wherein the space determiner traces the position of the user and a face of the user using the sensing signal, determines, as the rendering space, an entire space between a 3D display unit and the face of the user, and determines, as the sensing space, a predetermined sized space between the 3D display unit and the face of the user.

5. The 3D space interface apparatus of claim 3, wherein the manipulation object detector detects, as the manipulation object, any one or more of hands of the user within the sensing space, a body of the user within the sensing space, and an object within the sensing space.

6. The 3D space interface apparatus of claim 3, wherein the predetermined reaction corresponding to the predetermined movement and the contact is at least one of a transformation expanding or compressing the 3D virtual object, a rotation of the 3D virtual object, a movement of the 3D virtual object, a selection of a portion of the 3D virtual object where the contact has been made, a performance of a predetermined command corresponding to the predetermined movement or the contact, a creation of a new 3D virtual object, and a removal of the 3D virtual object.

7. The 3D space interface apparatus of claim 3, wherein the reaction generator further includes an ultrasonic wave generator configured to generate a contact signal enabling a contact sensation by sending ultrasonic waves to the manipulation object when contact has been made with the 3D virtual object.

8. A 3D space interface method for interfacing with a 3D virtual object, the method comprising:
   generating a sensing signal for sensing a position and a movement of a manipulation object;
   determining a rendering space located between a 3D display unit and a user, in which the 3D virtual object will be outputted;
   determining a sensing space occupying a predetermined portion of the rendering space, in which the manipulation object will be sensed;
   verifying, using the sensing signal, whether a contact between the 3D virtual object and the manipulation object has been made; and
   generating a predetermined reaction corresponding to the contact when the contact has been verified as being made,
   wherein the verifying includes:
   correcting a distortion of the rendering space and the sensing space, the rendering space and the sensing space varying depending on a position of the user; and
   aggregating the corrected rendering space and the corrected sensing space to verify whether the contact between the 3D virtual object in the corrected rendering space and the manipulation object in the corrected sensing space has been made.

9. The 3D space interface method of claim 8, wherein the sensing signal is generated by at least one of a color camera, a depth camera, and a motion sensor.

10. The 3D space interface method of claim 8, wherein the interfacing includes:
    3D-rendering the 3D virtual object in accordance with the position of the user to output the rendered 3D virtual object in the rendering space;
    detecting the manipulation object positioned in the sensing space using the sensing signal and tracing a movement of the manipulation object;
    sensing whether contact between the manipulation object and the 3D virtual object has been made;
    verifying whether a predetermined movement of the manipulation object has occurred by tracing movement of the manipulation object; and
    generating the predetermined reaction corresponding to one or more of the predetermined movement and the contact.

11. The 3D space interface method of claim 8, wherein the determining of the rendering space and the sensing space includes:
    determining, as the rendering space, an entire space between a 3D display unit and a face of the user.

12. The 3D space interface method of claim 10, wherein the object of the manipulation object detects, as the manipulation object, any one or more of hands of the user within the sensing space, a body of the user within the sensing space, and an object within the sensing space.

13. The 3D space interface method of claim 10, wherein the predetermined reaction corresponding to the predetermined movement and the contact is at least one of a transformation expanding or compressing the 3D virtual object, a rotation of the 3D virtual object, a movement of the 3D virtual object, a selection of a portion of the 3D virtual object where the contact has been made, a performance of a predetermined command corresponding to the predetermined movement or the contact, a creation of a new 3D virtual object, and a removal of the 3D virtual object.

14. The 3D space interface method of claim 10, further comprising:
    sending ultrasonic waves to the manipulation object when contact has been made with the 3D virtual object to generate a contact signal enabling a contact sensation.

15. An apparatus for interfacing with a rendered three-dimensional (3D) virtual object in a 3D space, the apparatus comprising:
    a processor configured to control one or more processor-executable units;
    a sensing generator, including at least one processor, configured to generate a sensing signal for tracking a position and a movement of a manipulation object of a user in a sensing space of the 3D virtual object;

a space determiner, including at least one processor, configured to determine:

a rendering space located between a 3D display unit and the user, in which the 3D virtual object will be outputted, and a sensing space occupying a predetermined portion of the rendering space, in which the manipulation object will be sensed;

an interface, including at least one processor, configured to verify, using the sensing signal, whether a predetermined movement of the manipulation object that results in contact between the manipulation object and the 3D object has occurred in the sensing space; and a reaction generator, including at least one processor, configured to generate a predetermined reaction corresponding to the predetermined movement and to output the predetermined reaction such that it may be perceived by the user when the contact has been verified by the interface unit, wherein the interface corrects a distortion of the rendering space and the sensing space, each space varying depending on a position of the user, aggregates the corrected rendering space and the corrected sensing space, and verifies whether the contact has been made between the 3D virtual object in the corrected rendering space and the manipulation object in the corrected sensing space.

16. The apparatus of claim 15, wherein the reaction generator further includes an ultrasonic wave-generation unit to generate a contact signal enabling the user to perceive a contact sensation by sending ultrasonic waves to the manipulation object when contact has been made with the 3D virtual object.

17. The apparatus of claim 15, wherein the reaction generator alters an appearance of the 3D virtual object in response to the predetermined movement.

18. The apparatus of claim 15, wherein, in response to the predetermined movement, the reaction generator performs at least one of:

a transformation expanding or compressing the 3D virtual object, a rotation of the 3D virtual object, a movement of the 3D virtual object, a selection of a portion of the 3D virtual object where the contact has been made, a performance of a predetermined command corresponding to the predetermined movement or the contact, a creation of a new 3D virtual object, and a removal of the 3D virtual object.

19. A method for interfacing with a rendered three-dimensional (3D) virtual object in a 3D space, comprising:

generating a sensing signal to track a position and a movement of a manipulation object of a user in a sensing space of the 3D virtual object;

determining a rendering space located between a 3D display unit and the user, in which the 3D virtual object will be outputted;

determining a sensing space occupying a predetermined portion of the rendering space, in which the manipulation object will be sensed; verifying, using the sensing signal, whether a predetermined movement of the manipulation object that results in contact between the manipulation object and the 3D object has occurred in the sensing space; and generating a predetermined reaction corresponding to the predetermined movement and outputting the predetermined reaction such that it may be perceived by the user when the contact has been verified, wherein the verifying includes:

correcting a distortion of the rendering space and the sensing space, the rendering space and the sensing space varying depending on a position of the user; and aggregating the corrected rendering space and the corrected sensing space to verify whether the contact between the 3D virtual object in the corrected rendering space and the manipulation object in the corrected sensing space has been made.

20. The method of claim 19, further comprising:

generating a contact signal enabling the user to perceive a contact sensation by sending ultrasonic waves to the manipulation object when contact has been made with the 3D virtual object.

21. A non-transitory computer-readable storage medium encoded with computer readable code comprising a program for implementing the method of claim 19.

* * * * *